(12) United States Patent
Wei (10) Patent No.: US 10,495,892 B2
(45) Date of Patent: Dec. 3, 2019

(54) DISPLAY ASSEMBLY, DRIVING METHOD THEREOF, AND DISPLAY DEVICE

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 75 days.

(21) Appl. No.: 15/741,748

(22) PCT Filed: Aug. 3, 2017

(86) PCT No.: PCT/CN2017/095813
§ 371 (c)(1),
(2) Date: Jan. 3, 2018

(87) PCT Pub. No.: WO2018/024233
PCT Pub. Date: Feb. 8, 2018

(65) Prior Publication Data
US 2019/0072773 A1    Mar. 7, 2019

(30) Foreign Application Priority Data

Aug. 3, 2016 (CN) .......................... 2016 1 0629295

(51) Int. Cl.
*G02B 27/22* (2018.01)
*G02B 27/60* (2006.01)

(52) U.S. Cl.
CPC ......... *G02B 27/2214* (2013.01); *G02B 27/60* (2013.01)

(58) Field of Classification Search
CPC .......................... G02B 27/2214; G02B 27/60
(Continued)

(56) References Cited

U.S. PATENT DOCUMENTS

2001/0031405 A1* 10/2001 Phillips .................. G02B 5/223
430/7
2011/0211255 A1    9/2011 Mashitani
(Continued)

FOREIGN PATENT DOCUMENTS

CN    103021295 A    4/2013
CN    103424874 A    12/2013
(Continued)

OTHER PUBLICATIONS

International Search Report & Written Opinion dated Oct. 10, 2017, regarding PCT/CN2017/095813.
(Continued)

*Primary Examiner* — George G King
(74) *Attorney, Agent, or Firm* — Intellectual Valley Law, P.C.

(57) ABSTRACT

In accordance with some embodiments of the present disclosure, a three dimensional (3D) display assembly, a driving method thereof, and a display device are provided. The 3D display assembly includes a display panel comprising: a color filter substrate comprising a black matrix, a plurality of sub-pixels defined by the black matrix arranged in columns along a first direction, and a grating comprising a plurality of light-shielding parts arranged in an array form to define a plurality of openings; wherein: the grating is located on a light output side of the display panel, and a center line of a central opening of the grating is overlapped with a center line of the black matrix.

20 Claims, 10 Drawing Sheets

(58) Field of Classification Search
USPC .......................................................... 359/463
See application file for complete search history.

(56) References Cited

U.S. PATENT DOCUMENTS

| | | |
|---|---|---|
| 2012/0154696 A1 | 6/2012 | Koyama |
| 2015/0070478 A1 | 3/2015 | Wei |
| 2015/0309319 A1 | 10/2015 | Wei |
| 2016/0267859 A1 | 9/2016 | Lin et al. |
| 2017/0017086 A1* | 1/2017 | Wei ........................ H04N 13/31 |

FOREIGN PATENT DOCUMENTS

| | | | | |
|---|---|---|---|---|
| CN | 103792607 A | | 5/2014 | |
| CN | 203673154 U | | 6/2014 | |
| CN | 104102043 A | | 10/2014 | |
| CN | 104570370 | * | 4/2015 | ............. H04N 13/31 |
| CN | 105549214 A | | 5/2016 | |
| WO | WO2016/123910 | * | 8/2016 | ............. H04N 13/31 |

OTHER PUBLICATIONS

First Office Action in the Chinese Patent Application No. 201610629295.8, dated Mar. 28, 2018; English translation attached.

* cited by examiner

DISPLAY ASSEMBLY, DRIVING METHOD THEREOF, AND DISPLAY DEVICE

CROSS-REFERENCE TO RELATED APPLICATION

This application is a national stage application under 35 U.S.C. § 371 of International Application No. PCT/CN2017/095813, filed Aug. 3, 2017, which claims the priority of Chinese Patent Application No. 201610629295.8, filed on Aug. 3, 2016, the entire contents of which are incorporated herein by reference.

FIELD OF THE DISCLOSURE

The present disclosure generally relates to the field of display technology and, more particularly, relates to a display assembly, a driving method thereof, and a related display device.

BACKGROUND

In the existing display assemblies and display devices, delta pixels may be combined with slit gratings to realize naked eye 3D display. This may provide advantages including low crosstalk and strong 3-D percept. However, the disadvantages may include serious moiré fringe phenomenon which undesirably affects the display effect.

Accordingly, the disclosed display assembly, the driving method thereof, and the related display device are directed to solve one or more problems set forth above and other problems.

BRIEF SUMMARY OF THE DISCLOSURE

In accordance with some embodiments of the present disclosure, a three dimensional (3D) display assembly, a driving method thereof, and a display device are provided.

One aspect of present disclosure provides a 3D display assembly, comprising: a display panel comprising: a color filter substrate comprising a black matrix, a plurality of sub-pixels defined by the black matrix arranged in columns along a first direction, and a grating comprising a plurality of light-shielding parts arranged in an array form to define a plurality of openings; wherein: the grating is located on a light output side of the display panel, and a center line of a central opening of the grating is overlapped with a center line of the black matrix.

In some embodiments, each column of sub-pixels includes at least one first sub-pixel group for generating a first view picture and at least one second sub-pixel group for generating a second view picture, and the first sub-pixel group and the second sub-pixel group are arranged alternatively, and adjacent two columns of sub-pixels are misaligned by a displacement in the first direction.

In some embodiments, the displacement is approximately equal to a half of a width of the sub-pixel in the first direction.

In some embodiments, a number of sub-pixels in the first sub-pixel group and a number of sub-pixels in the second sub-pixel group are multiples of three.

In some embodiments, each sub-pixel is adjacent to six sub-pixels, a color of each of the six adjacent sub-pixels being different from a color of the sub-pixel.

In some embodiments, each light-shielding part has a first portion and a second portion, and a projection of the first portion and a projection of the second portion on a plane perpendicular to the first direction are partially overlapped.

In some embodiments, an overlapped length of the projection of the first portion and the projection of the second portion along the first direction on the plane is less than a half of a length of the sub-pixel in a second direction.

In some embodiments, the width of the sub-pixel in the first direction is approximately equal to a half of the length of the sub-pixel in the second direction.

In some embodiments, the first portion comprises a first section and a second section that are misaligned by the first displacement in the first direction, and the first section and the second section cover the first view picture and the second view picture respectively.

In some embodiments, the first section and the second section partially cover nine sub-pixels respectively.

In some embodiments, the first section and the second section cover twelve sub-pixels respectively.

In some embodiments, a centroid connection of each of the plurality of light-shielding parts and a diagonal adjacent light-shielding part has an angle respect to the second direction.

In some embodiments, a value of tangent of the angle is in a range between ⅓ and ⅙.

In some embodiments, the value of tangent of the angle is approximately ⅖; a length of each of the plurality of light-shielding parts in the first direction is about 18 times of the width of the sub-pixel in the first direction; and a width of each of the plurality of light-shielding parts in the second direction is about 2 times of the length the sub-pixel in the second direction.

In some embodiments, the value of tangent of the angle is approximately ⅙; a length of each of the plurality of light-shielding parts in the first direction is about 12 times of the width of the sub-pixel in the first direction; and a width of each of the plurality of light-shielding parts in the second direction is about 2 times of the length the sub-pixel in the second direction.

Another aspect of the present disclosure includes a display device, comprising the disclosed 3D display assembly.

Another aspect of the present disclosure includes a method for driving the disclosed 3D display assembly, comprising: receiving an image signal including a first view picture and a second view picture; and displaying the first view picture and the second view picture in first sub-pixel groups and second sub-pixel groups respectively and simultaneously.

Other aspects of the present disclosure can be understood by those skilled in the art in light of the description, the claims, and the drawings of the present disclosure.

BRIEF DESCRIPTION OF THE DRAWINGS

Various objectives, features, and advantages of the present disclosure can be more fully appreciated with reference to the detailed description of the present disclosure when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

Reference input now be made in detail to exemplary embodiments of the invention, which are illustrated in the accompanying drawings in order to fully understand and being able to implementing the present disclosure and to realizing the technical effect. It should be understood that the following description has been made only by way of example, but not to limit the present disclosure. Various embodiments of the present disclosure and various features in the embodiments that are not conflicted with each other can be combined and rearranged in various ways. Without departing from the spirit and scope of the present disclosure, modifications, equivalents, or improvements to the present disclosure are understandable to those skilled in the art and are intended to be encompassed within the scope of the present disclosure.

In accordance with various embodiments, the present disclosure provides a display assembly, a driving method thereof, and a display device.

Figure 1:
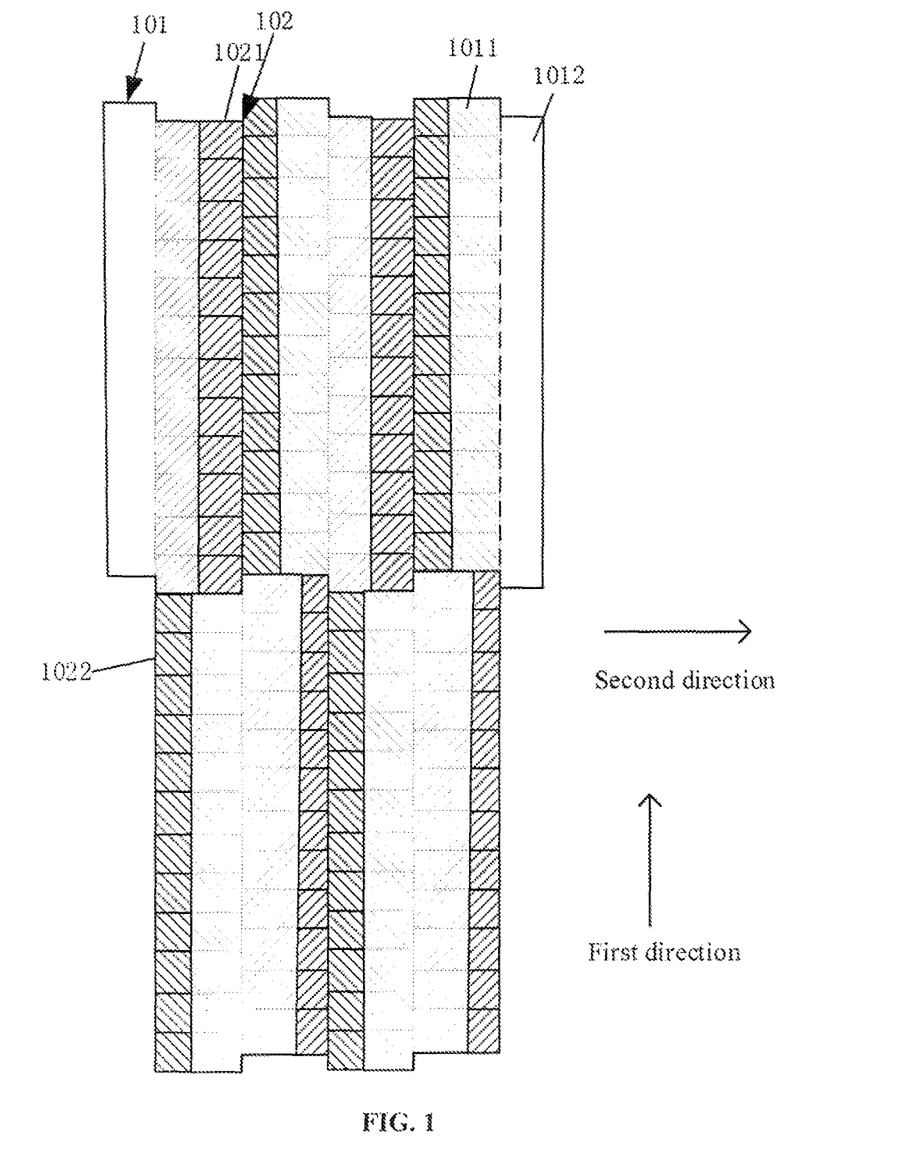
FIG. 1 is a schematic diagram of an exemplary display assembly including an arrangement of sub-pixels and light-shielding parts of a grating in accordance with some embodiments of the present disclosure.

Referring to FIG. 1, an arrangement of sub-pixels and light-shielding parts of a grating in an exemplary display assembly is shown in accordance with some embodiments of the present disclosure. It should be noted that, a positional relationship between projections of the sub-pixels and the grating on the plane of the display panel is illustrated in FIG. 1.

As shown, the disclosed display assembly can include a display panel (the blocks having oblique lines inside shown in FIG. 1) including a plurality of sub-pixels 102 arranged in columns, and a grating (the semi-transparent blocks shown in FIG. 1) disposed on a light-emitting side of the display panel. That is, the plurality of sub-pixels 102 and the grating can be arranged in different layers, and the grating can cover a portions of the plurality of sub-pixels 102.

Figure 3A:
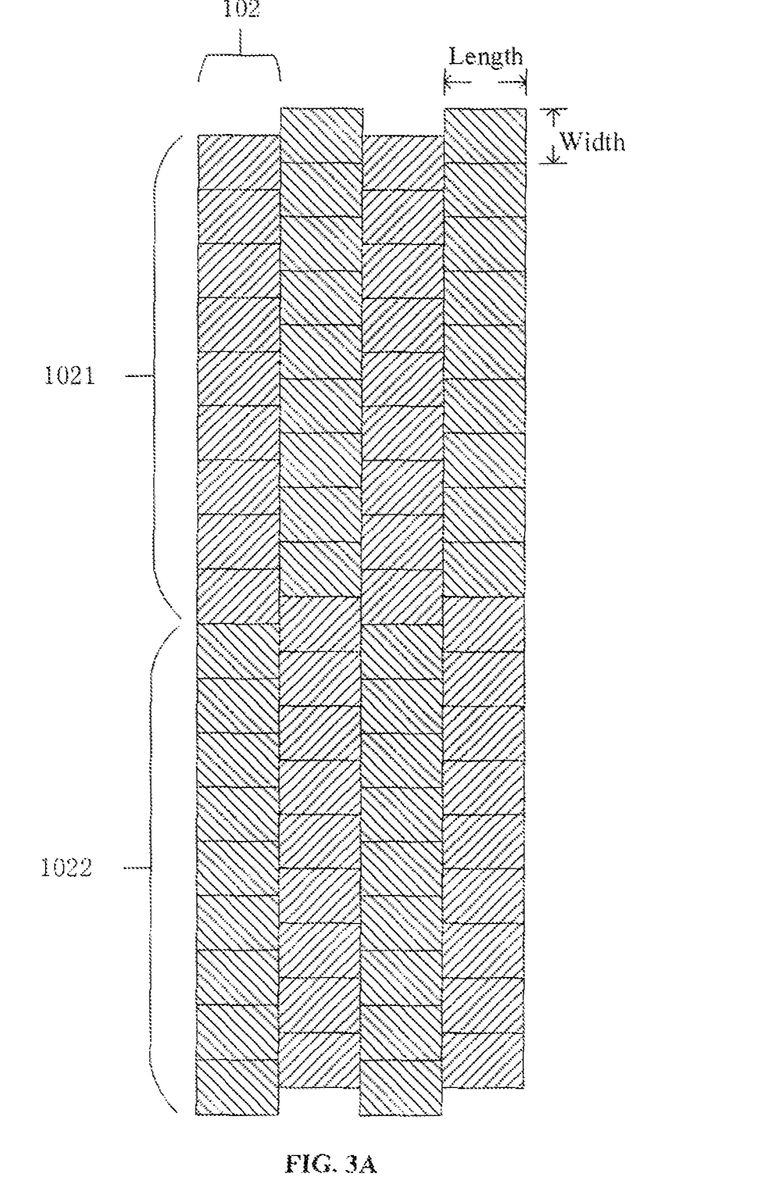
FIG. 3A is a schematic diagram of a first sub-pixel group and a second sub-pixel group respectively including 9 sub-pixels in accordance with some embodiments of the present disclosure.
Figure 3B:
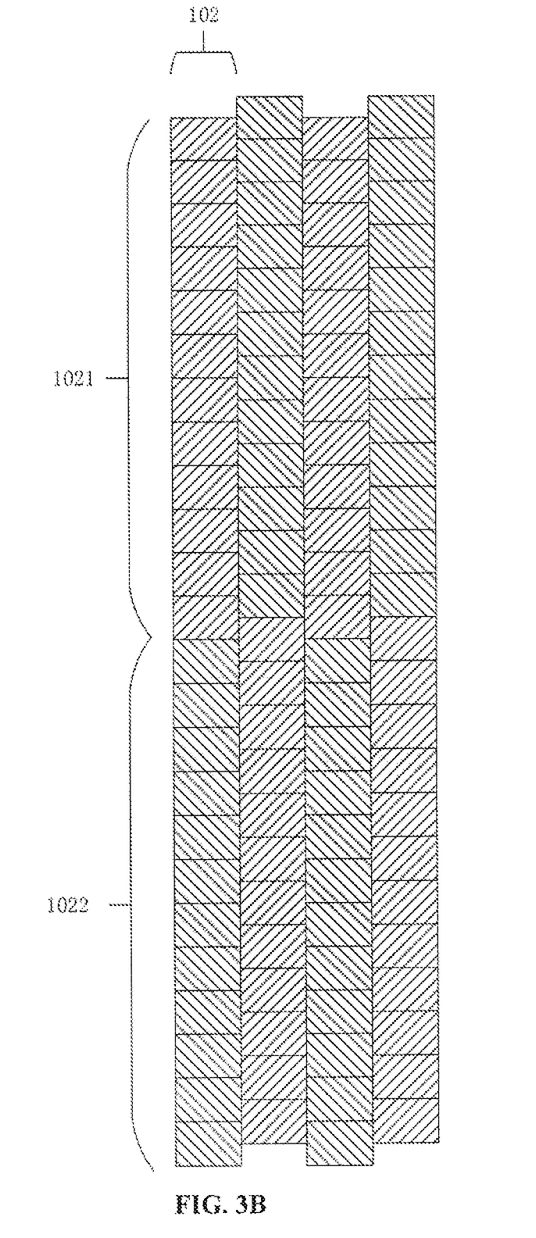
FIG. 3B is a schematic diagram of a first sub-pixel group and a second sub-pixel group respectively including 12 sub-pixels in accordance with some embodiments of the present disclosure.

Referring to FIGS. 3A and 3B, two examples of arrangement of sub-pixels are shown in accordance with some embodiments of the present disclosure. As illustrated, the sub-pixels 102 disposed in adjacent two columns can be misaligned or staggered with each other by a first displacement in the column direction. In some embodiments, the first displacement can be a half width of a single sub-pixel in the column direction, as shown in FIGS. 1, 3A and 3B.

Each column of the sub-pixels 102 can include a first sub-pixel group 1021 for generating a first-view picture, and a second sub-pixel group 1022 for generating a second-view picture. The first sub-pixel group 1021 and the second sub-pixel group 1022 in a same column can be arranged alternately. The first sub-pixel group 1021 can include a plurality of first sub-pixels arranged in succession, and the second sub-pixel group 1022 can include a plurality of second sub-pixels arranged in succession.

In the adjacent two columns, the first sub-pixel group 1021 and the second sub-pixel group 1022 are alternately arranged. As shown in FIGS. 1, 3A and 3B, the sub-pixels in the first sub-pixel group 1021 and the sub-pixels in the second sub-pixel group 1022 are respectively denoted by slash-filling in different directions.

In some embodiments, the number of sub-pixels in the first sub-pixel group can be equal to the number of sub-pixels in the second sub-pixel group. Further, the number of sub-pixels in the first sub-pixel group and the number of sub-pixels in the second sub-pixel group can be multiples of 3. For example, as shown in FIG. 3A, the first sub-pixel group and the second sub-pixel group can respectively include 9 sub-pixels. As another example, as shown in FIG. 3B, the first sub-pixel group and the second sub-pixel group can respectively include 12 sub-pixels.

Figure 4:
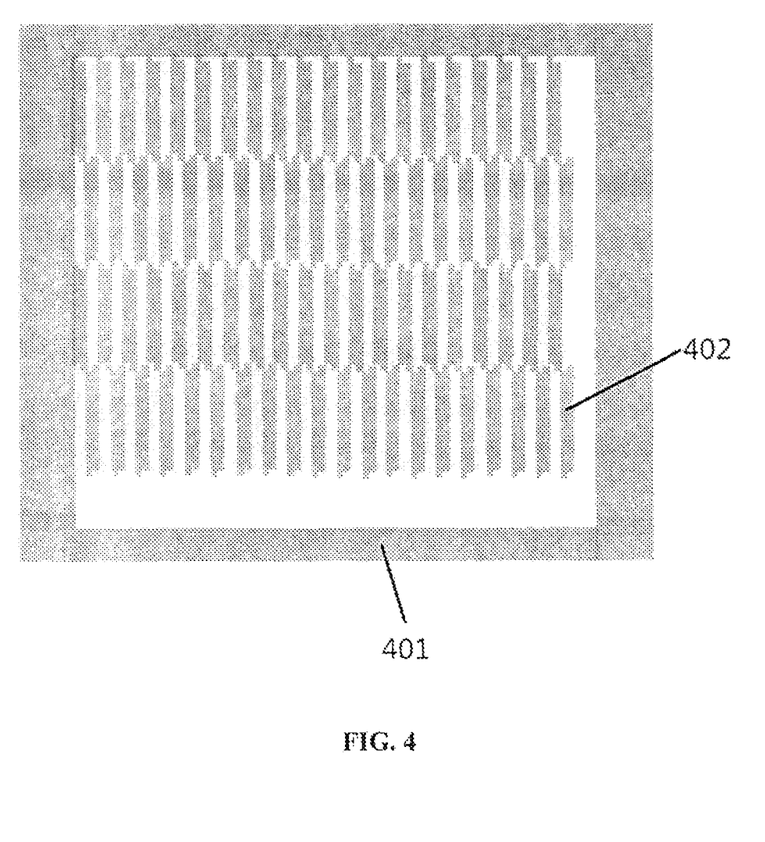
FIG. 4 is a schematic structural diagram of an exemplary grating in accordance with some embodiments of the present disclosure.
Figure 5:
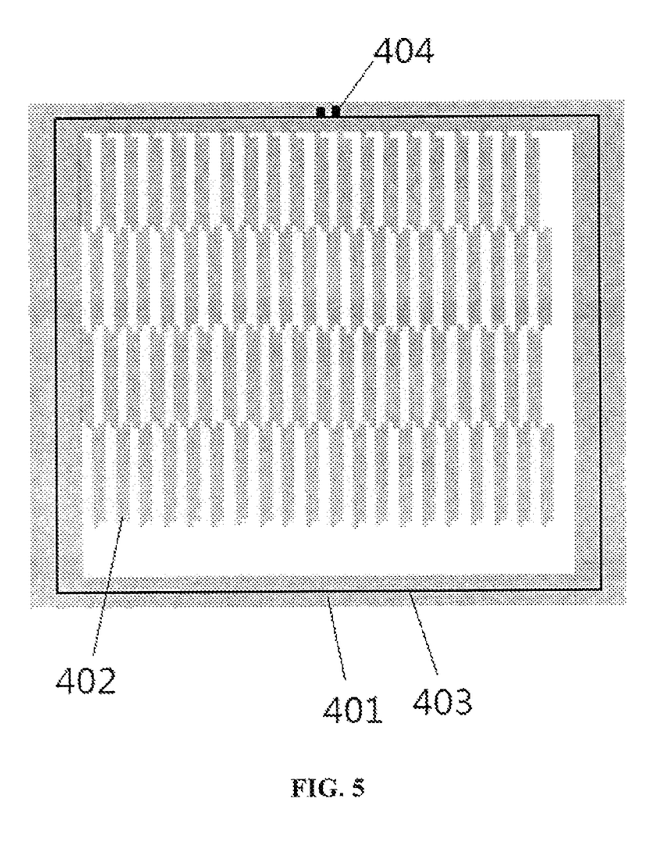
FIG. 5 is a schematic structural diagram of another exemplary grating in accordance with some other embodiments of the present disclosure.

Referring to FIGS. 4 and 5, schematic structural diagrams of two exemplary gratings are shown in accordance with various embodiments of the present disclosure. Referring to a combination of FIGS. 1, 4 and 5, the grating can include a plurality of light-shielding parts arranged in an array.

Each of the light-shielding parts can include two portions 101 which are misaligned by a second displacement in a second direction (e.g., row direction). The second displacement can be less than a length of the light-shielding part in the second direction.

Further, the projections of the two portions 101 of each light-shielding parts can be partially overlapped. For example, as shown in FIG. 1, the portions 101 in the upper row can be defined as the first portions, and the portions 101 in the lower row can be defined as the second portions. As such, for each first portion, there are two corresponding second portions that are adjacent to the first portion. And for each second portion, there are two corresponding first portions that are adjacent to the second portion.

In the existing display devices, the grating pitch can be different with the grid spacing of the black matrixes of the display panel. The black matrixes are composed of light-shielding stripes crossing each other in a same layer, and are used for defining the areas where the sub-pixels are located. Since the grating pitch and the grid spacing of the black matrixes are different, the realization of 3D display based on a combination of the grating pitch and the grid spacing of the black matrixes can cause black stripes which are called "moiré fringes."

Figure 7:
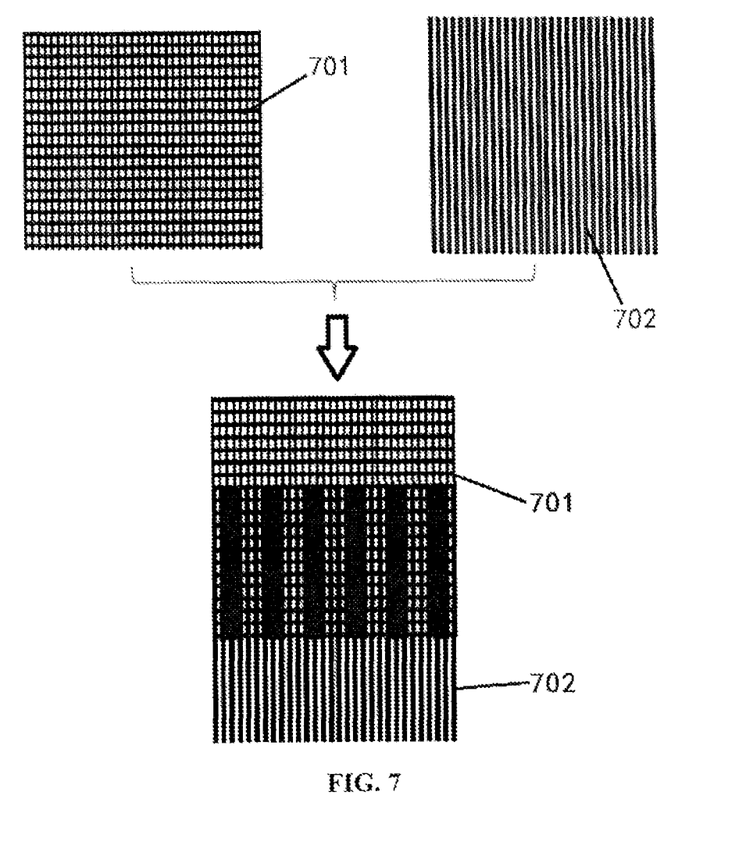
FIG. 7 is a schematic diagram showing mechanism of generating moiré fringes.

Specifically, referring to FIG. 7, a schematic principle diagram of the moiré fringes generation in the existing technique is shown. The black matrixes 701 are superimposed with the grating 702 to realize 3D display. That is, the orthographic projection of the black matrixes 701 on the plane of the display panel and the orthographic projection of the grating 702 on the plane of the display panel are superimposed. If the light-shielding stripes of the grating 702 are parallel to the light-shielding stripes in the column direction of the black matrixes 701, the moiré fringes can appear.

Figure 8:
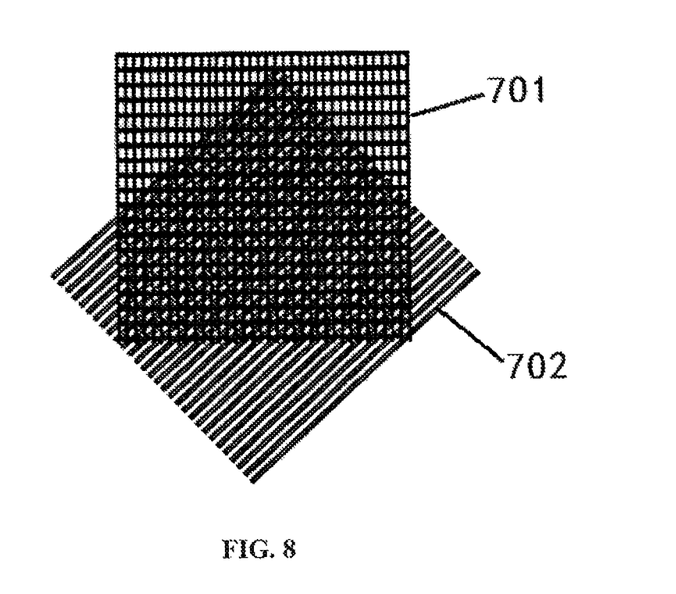
FIG. 8 is a schematic diagram of showing a mechanism of eliminating moiré fringes in accordance with some other embodiments of the present disclosure.

Referring to FIG. 8, a schematic principle diagram of the moiré elimination is shown in accordance with some other embodiments of the present disclosure.

As illustrated, when the grating 702 is rotated in the plane parallel to the display panel to form an angle between the light-shielding stripes and the column direction, and a different of the grating pitch and the grid spacing of the black matrixes in the column direction is within a certain range, the width of the moiré fringes can be so small that they cannot be recognized by human eyes. Therefore, the moiré fringe phenomenon can be avoided or eliminated.

Specifically, when the angle θ between the light-shielding stripes (or the extension direction of the openings) of the grating and the column direction belongs to the intersection of $\theta_n$ in the following formula, the moiré fringes can be eliminated:

$$\theta_n > \arccos \frac{P^2(n^2A^2 + B^2) - A^2B^2}{2nABP^2};$$

$$\theta_n < 90° - \arccos \frac{P^2(n^2A^2/9 + B^2) - A^2B^2/9}{2nABP^2/3};$$

$$|71.56° - \theta_n| >$$

$$\arccos \frac{P^2\left[n^2\left(\frac{A}{3} \times \sin 71.56°\right)^2 + B^2\right] - \left(\frac{A}{3} \times \sin 71.56°\right)^2 B^2}{2n\left(\frac{A}{3} \times \sin 71.56°\right)^2 BP^2};$$

Where P is the width of the smallest moiré fringes visible to human eyes, A is the width of the sub-pixels in the row direction, B is the grating pitch. Taking n=1, 2, 3 . . . 100 into the above formula one by one, the corresponding θ, can be calculated.

Therefore, the moiré fringe phenomenon can be reduced when the extension direction of the grating openings is inclined with respect to the sub-pixel columns. However, the crosstalk phenomenon can be increased with the inclination of the grating openings.

Accordingly, in some embodiments of the disclosed display assembly, a first sub-pixel group for generating a first-view screen and a second sub-pixel group for generating a second-view screen can be arranged alternately in the column direction on the display panel respectively. Therefore, the light-shielding parts of the grating can be arranged alternately. As such, the whole arrangement can have an inclination effect to reduce the moiré fringes.

In some embodiments, still referring to FIG. 1, each of the light-shielding parts 101 can partially cover all the sub-pixels in the first sub-pixel group 1021 and can partially cover all the sub-pixels in the second sub-pixel group 1021 that is adjacent to the first sub-pixel group 1021 in the row direction.

Since each of the light blocking portions can cover all of the sub-pixels in the first sub-pixel group and partially cover each sub-pixel in the first sub-pixel group, and each of the light-blocking portions can cover the second sub-pixel group and partially cover each sub-pixel in the second sub-pixel group, the crosstalk between lights of different view angles can be avoided. Therefore, the display effect can be preserved from being lowered due to alternately arrangement of the light-shielding parts.

In some embodiments, still referring to FIG. 1, the grating can include a plurality of light-shielding parts arranged in rows. Each light-shielding part can include a plurality of portions 101 which are alternately arrayed in the row direction. Two adjacent portions 101 are misaligned by the second displacement in the row direction. And the projections of two adjacent portions 101 can be partially overlapped in the row direction.

The portions 101 can define a plurality of light-transmitting portions. Each light-transmitting portion can include a first sub-light-transmitting portion and a second light-transmitting portion. The first sub-light-transmitting portion can correspond to a portion of the first sub-pixel group 1021. The second sub-light-transmitting portion can correspond to a portion of the second sub-pixel group 1022. The extension direction of the openings of the first sub-light transmitting portion and the second sub-light transmitting portion is in the column direction. As shown in FIG. 1, the unmasked region of the sub-pixels can correspond to the light-transmitting portions of the grating.

Compared to the existing techniques in which the extension direction of the grating openings and the light-shielding parts is parallel to the column direction, in the disclosed display panel, the light-shielding parts and the grating openings are divided into multiple sub-portions. The adjacent sub-portions are alternately arranged in the row direction. As such, in a general view of the display panel, the inclination effect of the grating openings and the light-shielding parts can be realized.

In addition, the extension direction of the openings of the light-transmitting portions is parallel to the column direction of the sub-pixels. That is, the openings of the light-transmitting portions are actually not inclined. Instead, the disclosed alternate arrangement can realize the inclination effect in the general view of the display panel. Therefore, the disclosed display panel can eliminate the moiré fringes generated by the grating while the crosstalk is not increased.

In some embodiments, still referring to FIG. 1, each of the portions 101 can include a first section 1011 and a second section 1012 misaligned by the first displacement in a first direction (e.g., the column direction).

The first displacement between the first section 1011 and the second section 1012 in the column direction can be equal to the first displacement between the sub-pixels 102 of adjacent two columns in the column direction. In some embodiments, the first displacement can be a half width of a single sub-pixel in the column direction, as shown in FIG. 1.

Figure 6:
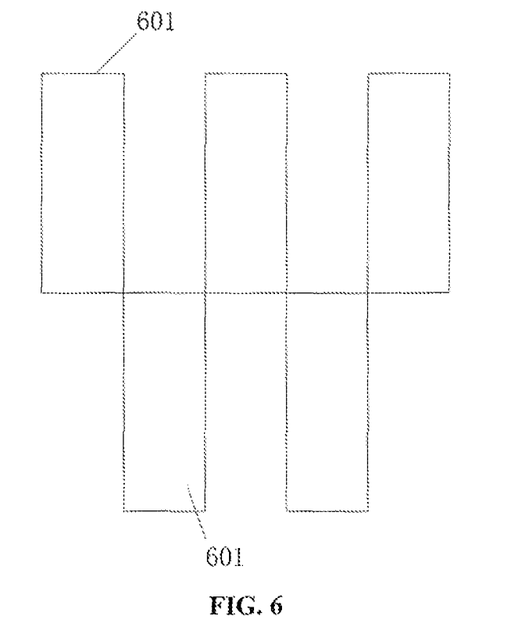
FIG. 6 is a schematic diagram of exemplary light-shielding parts of a grating in accordance with some other embodiments of the present disclosure.

Referring to FIG. 6, a schematic diagram of exemplary light-shielding parts of a grating is shown in accordance with some other embodiments of the present disclosure. Compared with the sections of the grating shown in FIG. 1, the adjacent sub-light-shield patterns shown in FIG. 6 do not have a misaligned/staggered design in the column direction. That is, the portions 601 have a rectangular shape without a deviation in the column direction.

The portions 601 of the grating shown in FIG. 6 can eliminate the moiré fringe phenomenon, and may not increase crosstalk. However, either the sub-pixels at the two ends of the first sub-pixel group or the second sub-pixel group may not be shielded, or the light-shielding part for blocking the first sub-pixel group may shield the sub-pixels in the second sub-pixel group. Thus, the viewing effect of the formed display device may be affected.

Therefore, turning back to FIG. 1, by using the misaligned arrangement by a displacement in the column direction, the portions 101 can completely and exactly shield the first sub-pixel group and the second sub-pixel group adjacent to the first sub-pixel group, thereby ensuring the viewing effect.

In some embodiments the grating in the disclosed display panel can include a substrate. The light-shielding parts can include an opaque pattern disposed on the substrate.

In some particular embodiments, the grating can be an active barrier.

In some embodiments, a material of the substrate can be indium tin oxide (ITO) glass.

Referring to FIG. 4, a schematic structural diagram of an exemplary grating is shown in accordance with some embodiments of the present disclosure. As illustrated, a non-display region of the grating can have a frame 401. The frame 401 can be a light-shielding pattern connected to an opaque pattern 402. The opaque pattern 402 can include a plurality of light-shielding parts 101 arranged in rows as shown in FIG. 1.

Referring to FIG. 5, a schematic structural diagram of an exemplary grating is shown in accordance with some other embodiments of the present disclosure. As illustrated, the frame 401 can include a conductive sub-frame 403 contacting with the frame 401. A width smaller of the conductive sub-frame 403 can be narrower than a width of the frame 401. The conductive sub-frame 403 can include two electrodes 404.

It should be noted that, the conductivity of ITO is not high, and a charging speed of the ITO is slow, which may cause a power-up delay. Therefore, by providing the conductive sub-frame, the current diffusion speed can be increased and the power-supply delay can be reduced.

In some embodiments, a material of the frame can be metal.

In some embodiments, the number of sub-pixels in the first sub-pixel group can be equal to the number of sub-pixels in the second sub-pixel group. Further, the number of sub-pixels in the first sub-pixel group and the number of sub-pixels in the second sub-pixel group can be multiples of 3. For example, as shown in FIG. 3A, the first sub-pixel group and the second sub-pixel group can respectively include 9 sub-pixels. As another example, as shown in FIG. 3B, the first sub-pixel group and the second sub-pixel group can respectively include 12 sub-pixels.

The size of the light-shielding pattern of the grating can be determined based on the number of sub-pixels included in the first subpixel group and the second subpixel group.

The light-shielding parts and the light-transmitting portions of the grating can be arranged alternately in both column direction and row direction. As such, the light-shielding parts and the light-transmitting portions of the grating can have an inclination effect in a general view. Actually, the openings and the light-shielding parts of the grating are extended in the column direction which is parallel to the extension direction of the sub-pixels array, which are not inclined.

In some specific implementations, according to different types of the display panel, the requirement of the inclination degree of the grating in the general view can be different. When the number of sub-pixels included in each of the first sub-pixel group is less, the inclination degree in the general view of the grating opening corresponding to the first sub-pixel group can be higher. For example, when 9 sub-pixels are included in the first sub-pixel group, the grating opening corresponding to the first sub-pixel group can be inclined in the general view by two of ninths. As another example, when 12 sub-pixels are included in the first sub-pixel group, the grating opening corresponding to the first sub-pixel group can be inclined in the general view by one of sixths.

Figure 2A:
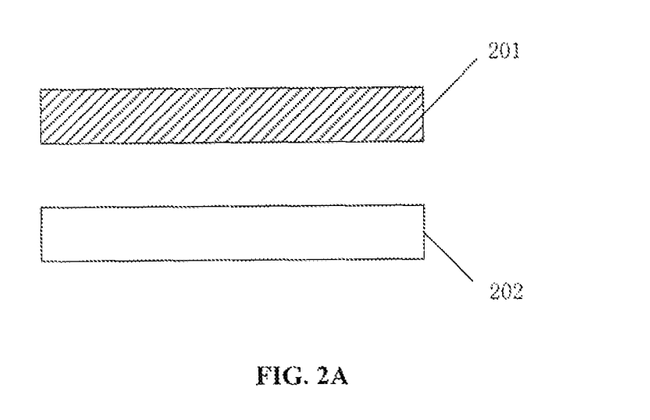
FIGS. 2A and 2B are schematic diagrams showing relative positions of a display panel and a grating in accordance with some embodiments of the present disclosure.
Figure 2B:
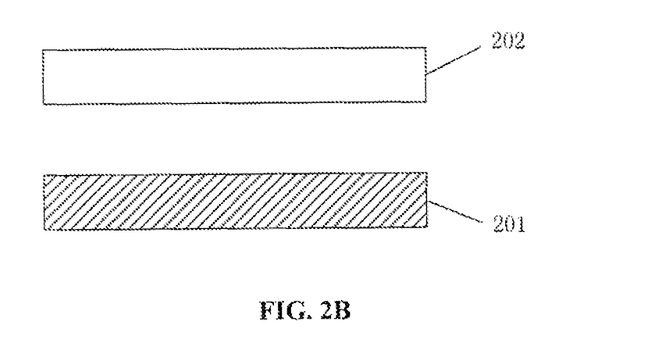

Referring to FIGS. 2A and 2B, relative positions of a display panel and a grating are shown in accordance with some embodiments of the present disclosure. As illustrated, the grating 201 may be provided on either the light input side or the light output side of the display panel 202.

In order to ensure the accuracy of the corresponding locations of the light-shielding parts of the grating and the sub-pixels, a lateral center opening position and a longitudinal center opening position of the grating can be respectively coincident with the center lines of the central black matrix pattern of the display panel.

Another aspect of the present disclosure provides a display device including a disclosed display assembly described above.

Figure 9:
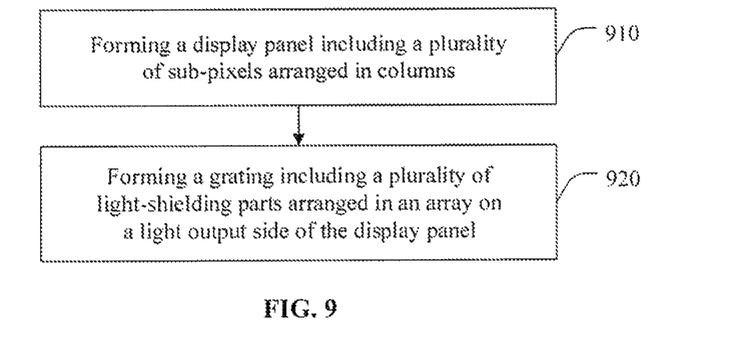
FIG. 9 is a schematic flow diagram of an exemplary method for fabricating a display assembly in accordance with some embodiments of the present disclosure.

Another aspect of the present disclosure provides a method for fabricating a display assembly. Referring to FIG. 9, a schematic flow diagram of an exemplary method for fabricating a display assembly is shown in accordance with some embodiments of the present disclosure. As illustrated, the method can include the following steps.

At step 910, a display panel including a plurality of sub-pixels arranged in columns can be formed.

In some embodiments, each column of sub-pixels can include at least one first sub-pixel group for generating a first view picture and at least one second sub-pixel group for generating a second view picture. Adjacent two columns of sub-pixels can be misaligned by a first displacement in a column direction.

In some embodiments, the first sub-pixel group can be formed to include a plurality of first sub-pixels arranged in succession, and the second sub-pixel group can be formed to include a plurality of second sub-pixels arranged in succession. A number of sub-pixels in the first sub-pixel group can be equal to a number of sub-pixels in the second sub-pixel group. The number of sub-pixels in the first sub-pixel group and the number of sub-pixels in the second sub-pixel group can be multiples of 3, such as 9 as illustrated in FIG. 3A or 12 as illustrated in FIG. 3B.

At step 920, a grating including a plurality of light-shielding parts arranged in an array can be formed on a light output side of the display panel.

In some embodiments, each of the light-shielding parts includes a plurality of portions which are alternately arrayed in a row direction, and adjacent rows of portions are misaligned by a second displacement in the row direction.

In some embodiments, projections of adjacent two rows of portions in the row direction are partially overlapped, and projections of adjacent two columns of portions in the column direction are partially overlapped.

Each light-shielding part of the grating can be formed axisymmetric with an adjacent opening of the grating respect to a boundary line of the light-shielding part and the adjacent opening in the column direction.

Each of the light-shielding parts can be formed to partially cover all of the sub-pixels in the first sub-pixel group, and to partially cover all of the sub-pixels in the second sub-pixel group, adjacent to and misaligned with the first sub-pixel group.

Each of the portions can be formed to include a first section and a second section that are misaligned with each other by the first displacement in the column direction.

In some embodiments, the first displacement can be less than or equal to a width of the sub-pixel in the column direction, and the second displacement can be less than a width of the portion in the row direction.

Figure 10:
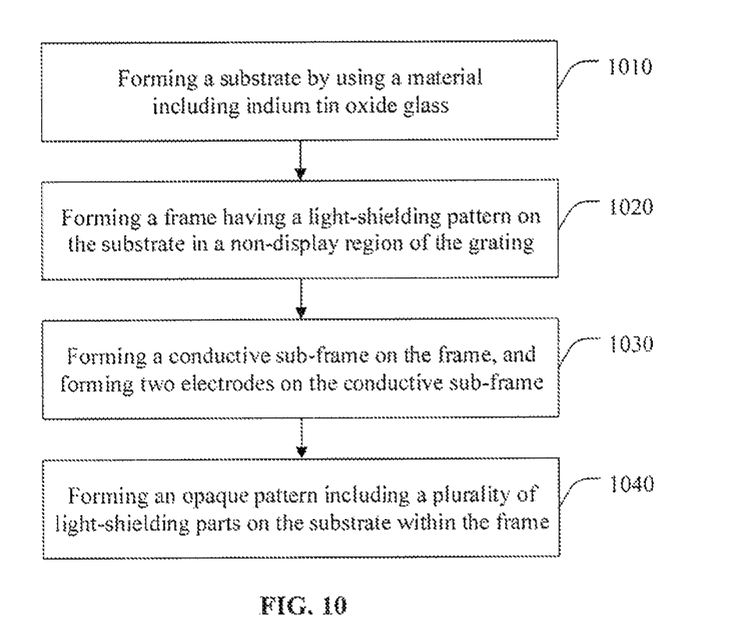
FIG. 10 is a schematic flow diagram of an exemplary method for fabricating a grating in a display assembly in accordance with some other embodiments of the present disclosure.

Referring to FIG. 10, a schematic flow diagram of an exemplary method for fabricating a grating in a display assembly is shown in accordance with some other embodiments of the present disclosure. As illustrated, the method can include the following steps.

At step 1010, a substrate can be formed by using a material including indium tin oxide glass.

At step 1020, a frame having a light-shielding pattern can be formed on the substrate in a non-display region of the grating.

At step 1030, a conductive sub-frame can be formed on the frame, and two electrodes can be formed on the conductive sub-frame. The conductive sub-frame can be in contact with the frame. A width of the conductive sub-frame can be narrower than a width of the frame.

At step 1040, an opaque pattern can be formed on the substrate within the frame. The opaque pattern can include the plurality of light-shielding parts 101 described above in connection with FIGS. 1, 4 and 5.

Accordingly, a display assembly, a driving method thereof, and a display device are provided.

One aspect of present disclosure provides a 3D display assembly, comprising: a display panel comprising: a color filter substrate comprising a black matrix, a plurality of sub-pixels defined by the black matrix arranged in columns along a first direction, and a grating comprising a plurality of light-shielding parts arranged in an array form to define a plurality of openings; wherein: the grating is located on a light output side of the display panel and a center line of a central opening of the grating is overlapped with a center line of the black matrix.

In some embodiments, each column of sub-pixels includes at least one first sub-pixel group for generating a first view picture and at least one second sub-pixel group for generating a second view picture, and the first sub-pixel group and the second sub-pixel group are arranged alternatively, and adjacent two columns of sub-pixels are misaligned by a displacement in the first direction.

In some embodiments, the displacement is approximately equal to a half of a width of the sub-pixel in the first direction.

In some embodiments, a number of sub-pixels in the first sub-pixel group and a number of sub-pixels in the second sub-pixel group are multiples of three.

In some embodiments, each sub-pixel is adjacent to six sub-pixels, a color of each of the six adjacent sub-pixels being different from a color of the sub-pixel.

In some embodiments, each light-shielding part has a first portion and a second portion, and a projection of the first portion and a projection of the second portion on a plane perpendicular to the first direction are partially overlapped.

In some embodiments, an overlapped length of the projection of the first portion and the projection of the second portion along the first direction on the plane is less than a half of a length of the sub-pixel in a second direction.

In some embodiments, the width of the sub-pixel in the first direction is approximately equal to a half of the length of the sub-pixel in the second direction.

In some embodiments, the first portion comprises a first section and a second section that are misaligned by the first displacement in the first direction, and the first section and the second section cover the first view picture and the second view picture respectively.

In some embodiments, the first section and the second section partially cover nine sub-pixels respectively.

In some embodiments, the first section and the second section cover twelve sub-pixels respectively.

In some embodiments, a centroid connection of each of the plurality of light-shielding parts and a diagonal adjacent light-shielding part has an angle respect to the second direction.

In some embodiments, a value of tangent of the angle is in a range between ⅓ and ⅙.

In some embodiments, the value of tangent of the angle is approximately ²⁄₉; a length of each of the plurality of light-shielding parts in the first direction is about 18 times of the width of the sub-pixel in the first direction; and a width of each of the plurality of light-shielding parts in the second direction is about 2 times of the length the sub-pixel in the second direction.

In some embodiments, the value of tangent of the angle is approximately ⅙; a length of each of the plurality of light-shielding parts in the first direction is about 12 times of the width of the sub-pixel in the first direction; and a width of each of the plurality of light-shielding parts in the second direction is about 2 times of the length the sub-pixel in the second direction.

Another aspect of the present disclosure includes a display device, comprising the disclosed 3D display assembly.

Another aspect of the present disclosure includes a method for driving the disclosed 3D display assembly, comprising: receiving an image signal including a first view picture and a second view picture; and displaying the first view picture and the second view picture in first sub-pixel groups and second sub-pixel groups respectively and simultaneously.

In the disclosed display assembly and the display device, a first subpixel group for displaying a first view screen and a second subpixel group for displaying a second view screen can be alternately arranged by a displacement in the column direction. Further, the light-shielding parts of the grating is designed as two adjacent portions that are alternately arranged by the displacement in the column direction. As such, the sub-shield portion can partially shield the first sub-pixel group and the second sub-pixel group adjacent to the first sub-pixel group. The disclosed design can generate an inclination effect of the display assembly, thereby eliminating the moiré fringes. In addition, the light-shielding parts of the grating are not actually inclined. Therefore, the crosstalk is not increased, and the display effect of the display device can be ensured.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Although the present disclosure has been described and illustrated in the foregoing illustrative embodiments, it is understood that the present disclosure has been made only by way of example, and that numerous changes in the details of embodiment of the present disclosure can be made without departing from the spirit and scope of the present disclosure, which is only limited by the claims which follow. Features of the disclosed embodiments can be combined and rearranged in various ways. Without departing from the spirit and scope of the present disclosure, modifications, equivalents, or improvements to the present disclosure are understandable to those skilled in the art and are intended to be encompassed within the scope of the present disclosure.

What is claimed is:

1. A three dimensional (3D) display assembly, comprising:
a display panel comprising:
a color filter substrate comprising a black matrix,
a plurality of sub-pixels defined by the black matrix arranged in columns along a first direction, and
a grating comprising a plurality of light-shielding parts arranged in an array form to define a plurality of openings;
wherein the grating is located on a light output side of the display panel:
the black matrix comprises a plurality of black matrix columns along the first direction and a plurality of black rows along the second direction;
the grating is arranged in a plurality of rows along a second direction;
a respective row of the plurality of rows comprises multiple light-shielding parts and multiple openings alternately arranged;
the multiple light-shielding parts in the respective row of the plurality of rows are misaligned by a first displacement in the second direction from multiple light-shielding parts in an adjacent row of the plurality of rows;
the multiple openings in the respective row of the plurality of rows are misaligned by the first displacement in the second direction from multiple openings in the adjacent row of the plurality of rows;
a respective one of the multiple light-shielding parts in the respective row of the plurality of rows comprises a first section and a second section that are misaligned by a second displacement in the first direction;
a boundary between the first section and the second section in the respective one of the multiple light-shielding parts in the respective row of the plurality of rows is substantially parallel to one of the plurality of black matrix columns along the first direction; and
an orthographic projection of the boundary on the black matrix overlaps with the one of the plurality of black matrix columns along the first direction.

2. The 3D display assembly of claim 1, wherein:
each column of sub-pixels includes at least one first sub-pixel group for generating a first view picture and at least one second sub-pixel group for generating a second view picture, and
the first sub-pixel group and the second sub-pixel group are arranged alternately, and
adjacent two columns of sub-pixels are misaligned by a third displacement in the first direction.

3. The 3D display assembly of claim 2, wherein:
the third displacement is approximately equal to a half of a width of a respective one of the plurality of sub-pixels in the first direction.

4. The 3D display assembly of claim 1, wherein:
a number of sub-pixels in the first sub-pixel group and a number of sub-pixels in the second sub-pixel group are multiples of three.

5. The 3D display assembly of claim 4, wherein:
for an interior sub-pixel that is surrounded by six adjacent sub-pixels, a color of each of the six adjacent sub-pixels is different from a color of the interior sub-pixel.

6. The 3D display assembly of claim 3, wherein:
an orthographic projection of a respective one the multiple light-shielding parts in the respective row of the plurality of rows and an orthographic projection of the adjacent multiple light-shielding part in the adjacent row of the plurality of rows on a plane perpendicular to the first direction are partially overlapped.

7. The 3D display assembly of claim 6, wherein:
an overlapped length of the orthographic projection of the respective one the multiple light-shielding parts in the respective row of the plurality of rows and the orthographic projection of the second portion adjacent multiple light-shielding part in the adjacent row of the plurality of rows along the first direction on the plane is less than a half of a length of the respective one of the plurality of sub-pixels in the second direction.

8. The 3D display assembly of claim 7, wherein:
the width of the respective one of the plurality of sub-pixels in the first direction is approximately equal to a half of the length of the respective one of the plurality of sub-pixels in the second direction.

9. The 3D display assembly of claim 6, wherein:
the first section and the second section cover the first view picture and the second view picture respectively.

10. The 3D display assembly of claim 9, wherein:
the first section and the second section partially cover nine sub-pixels respectively.

11. The 3D display assembly of claim 9, wherein:
the first section and the second section cover twelve sub-pixels respectively.

12. The 3D display assembly of claim 7, wherein:
a centroid connection of the respective one the multiple light-shielding parts in the respective row of the plurality of rows and the adjacent multiple light-shielding part in the adjacent row of the plurality of rows has an acute angle respect to the first direction.

13. The 3D display assembly of claim 12, wherein:
a value of tangent of the acute angle is in a range between ⅓ and ⅑.

14. The 3D display assembly of claim 12, wherein:
the value of tangent of the acute angle is approximately ⅔.

15. The 3D display assembly of claim 12, wherein:
the value of tangent of the acute angle is approximately ⅙.

16. A display device, comprising:
a 3D display assembly of claim 1, and one or more electrodes.

17. A method for driving a three dimensional (3D) display assembly of claim 1, comprising:
receiving an image signal including a first view picture and a second view picture; and
displaying the first view picture and the second view picture in first sub-pixel groups and second sub-pixel groups respectively and simultaneously.

18. The 3D display assembly of claim 2, wherein the second displacement is substantially the same as the third displacement.

19. The 3D display assembly of claim 1, wherein a length of each of the plurality of light-shielding parts in the first direction is about 18 times of the width of a respective one of the plurality of sub-pixels in the first direction; and
a width of each of the plurality of light-shielding parts in the second direction is about 2 times of the length the respective one of the plurality of sub-pixels in the second direction.

20. The 3D display assembly of claim 1, wherein a length of each of the plurality of light-shielding parts in the first direction is about 12 times of the width of a respective one of the plurality of sub-pixels in the first direction; and a width of each of the plurality of light-shielding parts in the second direction is about 2 times of the length the respective one of the plurality of sub-pixels in the second direction.

* * * * *